United States Patent [19]
Men et al.

[11] Patent Number: 5,597,271
[45] Date of Patent: Jan. 28, 1997

[54] EXCHANGEABLE CUTTING INSERT HAVING SECONDARY CUTTING EDGES USED AS WIPERS

[75] Inventors: Yuri Men, Haifa; Amir Satran, Kfar Vradim, both of Israel

[73] Assignee: Iscar Ltd., Migdal Tefen, Israel

[21] Appl. No.: 397,519

[22] Filed: Mar. 2, 1995

[30] Foreign Application Priority Data

Mar. 16, 1994 [IL] Israel .......................................... 108995

[51] Int. Cl.⁶ ................................. B23C 5/10; B23C 5/20
[52] U.S. Cl. .......................................................... 407/113
[58] Field of Search ..................................... 407/113–116

[56] References Cited

U.S. PATENT DOCUMENTS

| | | | |
|---|---|---|---|
| 5,071,292 | 12/1991 | Satran | 407/116 |
| 5,078,550 | 1/1992 | Satran et al. | 407/34 |
| 5,145,295 | 9/1992 | Satran | 407/113 |
| 5,232,319 | 8/1993 | Satran et al. | 407/113 |

FOREIGN PATENT DOCUMENTS

| | | |
|---|---|---|
| 0156780A2 | 10/1985 | European Pat. Off. . |
| 0358623 | 3/1990 | European Pat. Off. . |
| 0457488 | 11/1991 | European Pat. Off. . |
| 0489702A2 | 6/1992 | European Pat. Off. . |
| 0548752 | 6/1993 | European Pat. Off. . |
| 0577011 | 1/1994 | European Pat. Off. . |
| 9200612 | 3/1992 | Germany . |

*Primary Examiner*—M. Rachuba
*Assistant Examiner*—Kenneth J. Hansen
*Attorney, Agent, or Firm*—Pennie & Edmonds

[57] ABSTRACT

An exchangeable cutting insert for mounting in a cutter tool and comprising a substantially square, planar base; a substantially square upper rake surface and side flanks extending outwardly from respective edges of said base; each side flank intersecting said rake surface at successive main and secondary cutting edges; each secondary cutting edge being outwardly spaced with respect to its adjacent relief flank surface and being displaced towards said base with respect to its associated main cutting edge, the arrangement being such that when viewed in plan in the direction of said rake surface, each secondary cutting edge does not project beyond its associated main cutting edge.

4 Claims, 5 Drawing Sheets

EXCHANGEABLE CUTTING INSERT HAVING SECONDARY CUTTING EDGES USED AS WIPERS

FIELD OF THE INVENTION

This invention relates to an exchangeable cutting insert for drilling, turning and in particular milling operations and is preferably to be mounted in a milling cutter tool and for use in cutting recesses such as, for example, shoulders, slots, grooves or the like, having walls disposed at substantially 90° with respect to each other. Such recesses are hereinafter referred to as "recesses of the kind specified".

BACKGROUND OF THE INVENTION

Known milling cutter tools of this kind generally fall into two categories. In the first of these categories, the tool is provided with a single, peripherally disposed row of inserts, each insert being formed with a main cutting edge directed substantially parallel to the rotary axis of the cutting tool and designed to mill an upright wall of the recess or shoulder, and with a transversely directed secondary cutting edge designed to wipe or smooth a base wall of the recess. Such tools are, of course, limited as far as the depth of the recess which can be milled, this depth not being greater than the extent of the main cutting edge. In a second category of tools, the milling cutter is provided, in addition, to a lowermost row of cutting inserts of the kind just described, with one or more additional peripheral rows of inserts which are each provided with main cutting edges usually having positive axial rake angles. With such a tool, the extent of milling of the milled upright wall of the recess is, of course, increased. It will be understood that whilst the inserts comprising the lowermost row must be provided with the transversely-directed secondary cutting edges, the inserts comprising the second and any subsequent rows do not require the provision of such secondary cutting edges.

Furthermore, it is clearly desirable, from an economic point of view, that each constituent insert be provided with a maximum number of cutting edges which can be readily indexed into position as and when required. Most known milling cutter inserts used for the purpose indicated are either oblong-rectangular, and are therefore provided with two main cutting edges parallel to each other, or are triangular with three main cutting edges. In these known inserts, the main cutting edges may be associated with auxiliary or secondary cutting edges.

It has been proposed in EP 0 156 780 to use in a cylindrical milling cutter for the milling of recesses of the kind specified, wherein each insert is of a basic square shape having four indexable cutting edges, each main cutting edge being associated with a transversely-directed secondary cutting edge located on an extension of the insert which projects beyond the basic square shape thereof. The use of such inserts is, however, clearly limited. They can only serve in cylindrical milling cutting tools having a single row of inserts peripherally disposed on the cutter front face and therefore the depth of the recess formed by these inserts is limited to the extent of the cutting edge of each insert.

In an alternative proposal in EP 0 489 702 A2, there is disclosed an essentially square-shaped insert for a milling cutter having four main cutting edges, each main cutting edge having associated therewith a secondary cutting edge serving as a wiper, the main cutting edge extending slightly inwardly with respect to the associated secondary cutting edge at an angle, which is in the range of 0.5° to 4°. Such a cutting insert does not have projecting extensions which inherently restrict the depth of the recess. This insert, however, which is specified as being mounted at a negative radial rake angle, is subject to the essential problem present with such inserts, namely that the relief angle presented by the cutting edge at its leading end is very much greater than the relief angle presented by the cutting edge at its opposite trailing end. On the assumption that the relatively smaller relief angle presented by the insert at its trailing end is, in fact, the minimum relief angle which should be employed, it will be realized that the relief angle at the leading end is unduly large, thereby leading to an increased danger of weakening of the cutting edge at this point, and a consequent lowering of tool life.

This problem, which is inherent with conventional milling cutting inserts, has been recognized and discussed in the applicants' prior U.S. Pat. Nos. 5,071,292 and 5,078,550 and alternative proposals are made respectively in these prior patent specifications so as to overcome these problems or disadvantages. These proposals were, however, all made within the context of oblong-rectangular cutting inserts and their application to inserts of basically square shape wherein four alternative cutting edges were provided, was in no way envisaged.

The other disadvantage of the cutting insert, disclosed in EP 0 489 702, arises out of the configuration of the insert cutting edge, comprising as it does a main cutting edge portion and a secondary cutting edge portion inclined with respect thereto. The entire cutting edge is therefore non-rectilinear and seeing that both portions are in contact with the machined surface the degree of straightness and/or flatness of the machined surface which can be achieved is limited.

It is an object of the present invention to provide a new and improved exchangeable cutting insert for mounting, for example, in a milling cutter tool in which the above-referred-to disadvantages are substantially reduced or overcome.

BRIEF SUMMARY OF THE INVENTION

According to the present invention there is provided an exchangeable cutting insert for mounting in a cutter tool and comprising a substantially square, planar base; a substantially square upper rake surface and side flanks extending outwardly from respective edges of said base; each side flank intersecting said rake surface at successive main and secondary cutting edges; each secondary cutting edge being outwardly spaced with respect to its adjacent relief flank surface and being displaced towards said base with respect to its associated main cutting edge, the arrangement being such that when viewed in plan in the direction of said rake surface, each secondary cutting edge does not project beyond its associated main cutting edge.

With such a cutting insert when mounted in a cylindrical milling cutter tool, the insert can be indexable so that successive main cutting edges are presented for shoulder milling whilst adjacent, transversely disposed secondary cutting edges are successively presented for wiping or smoothing a base wall of the recess. By positioning each insert so that its operational main cutting edge presents a positive axial rake angle whilst a negative radial angle is defined between a radius extending from the rotary tool axis and a projection line of this radius on the plane formed by the main cutting edges, it is ensured that, on the one hand, the operational main cutting edge is machining the shoulder whilst its associated secondary cutting edge is spaced therefrom and, on the other hand, the adjacent transversely disposed secondary cutting edge is machining and wiping the base wall whilst its associated main cutting edge is spaced therefrom.

It is thus ensured that on the one hand, machining can be effected to any required depth without interference by projecting wiper edges, as is the case in the prior art as disclosed in EP 0 156 780. On the other hand, it is ensured that, during milling, the secondary cutting edge associated with the main milling cutting edge is spaced from the machined shoulder surface and is therefore protected from wear and the straightness and flatness of the machined surface is achieved.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENT

Figure 1:
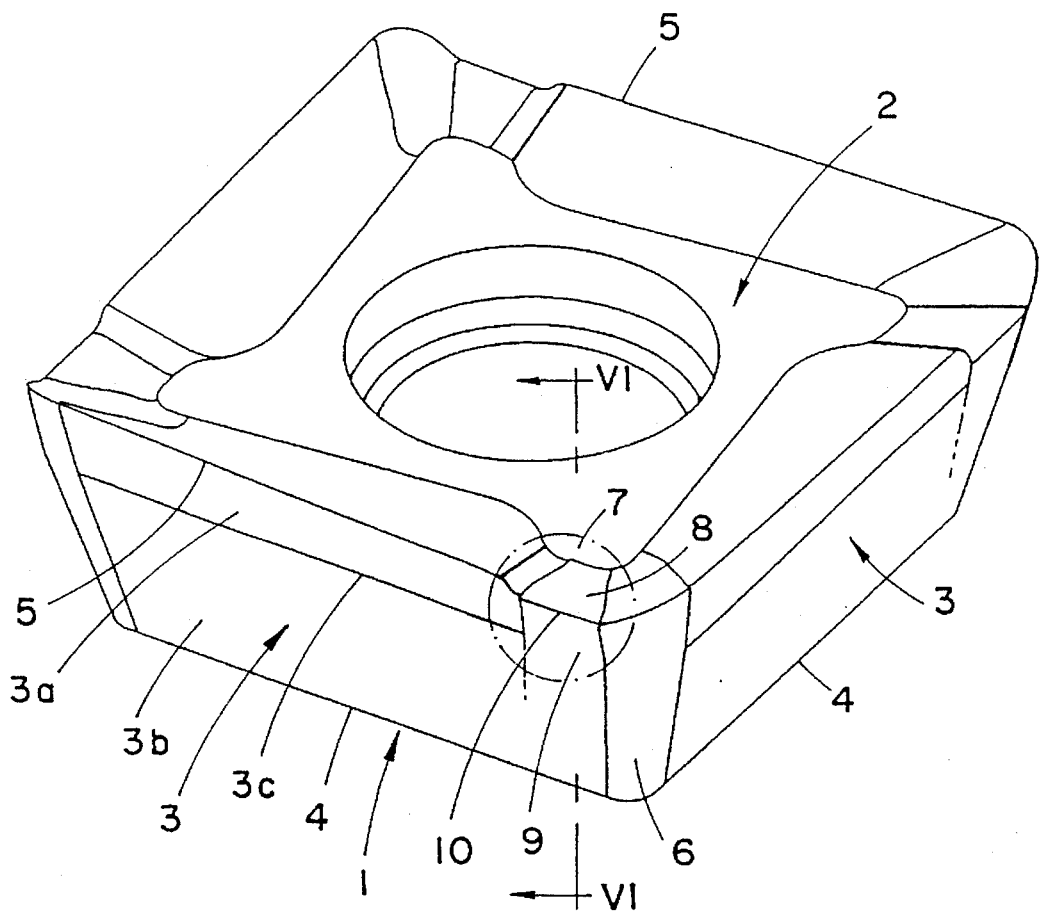
FIG. 1 is a perspective view of a cutting insert in accordance with the present invention suitable for use in milling, drilling or turning operations.
Figure 2:
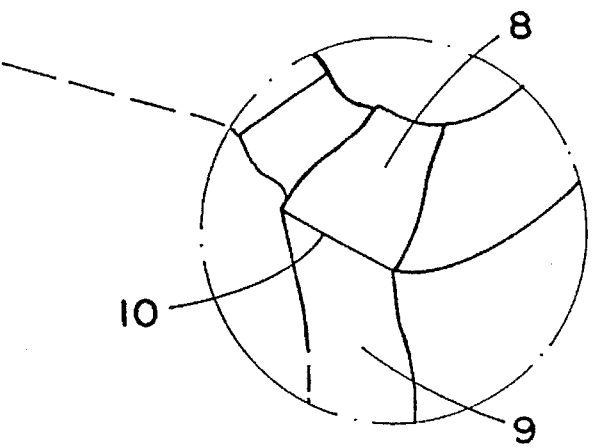
FIG. 2 is a view on an enlarged and exaggerated scale of a detail of the insert shown in FIG. 1.

As seen in FIGS. 1 and 2 of the drawings, an exchangeable cutting insert comprises a substantially square planar base 1 and a substantially square upper rake surface 2. Four identical side flanks 3 (only two being seen) extend outwardly from respective side edges 4 of the base 1 and intersect the rake surface 2 at respective main cutting edges 5. Adjacent relief flanks 3 merge with each other via corners 6 of the insert.

Formed in the rake surface 2 adjacent each insert corner 6 and merging with a right-hand extremity of each main cutting edge 5 is a depressed valley portion 7 having a base surface 8 which intersects an auxiliary relief flank 9 at a secondary cutting edge 10.

Figure 6:
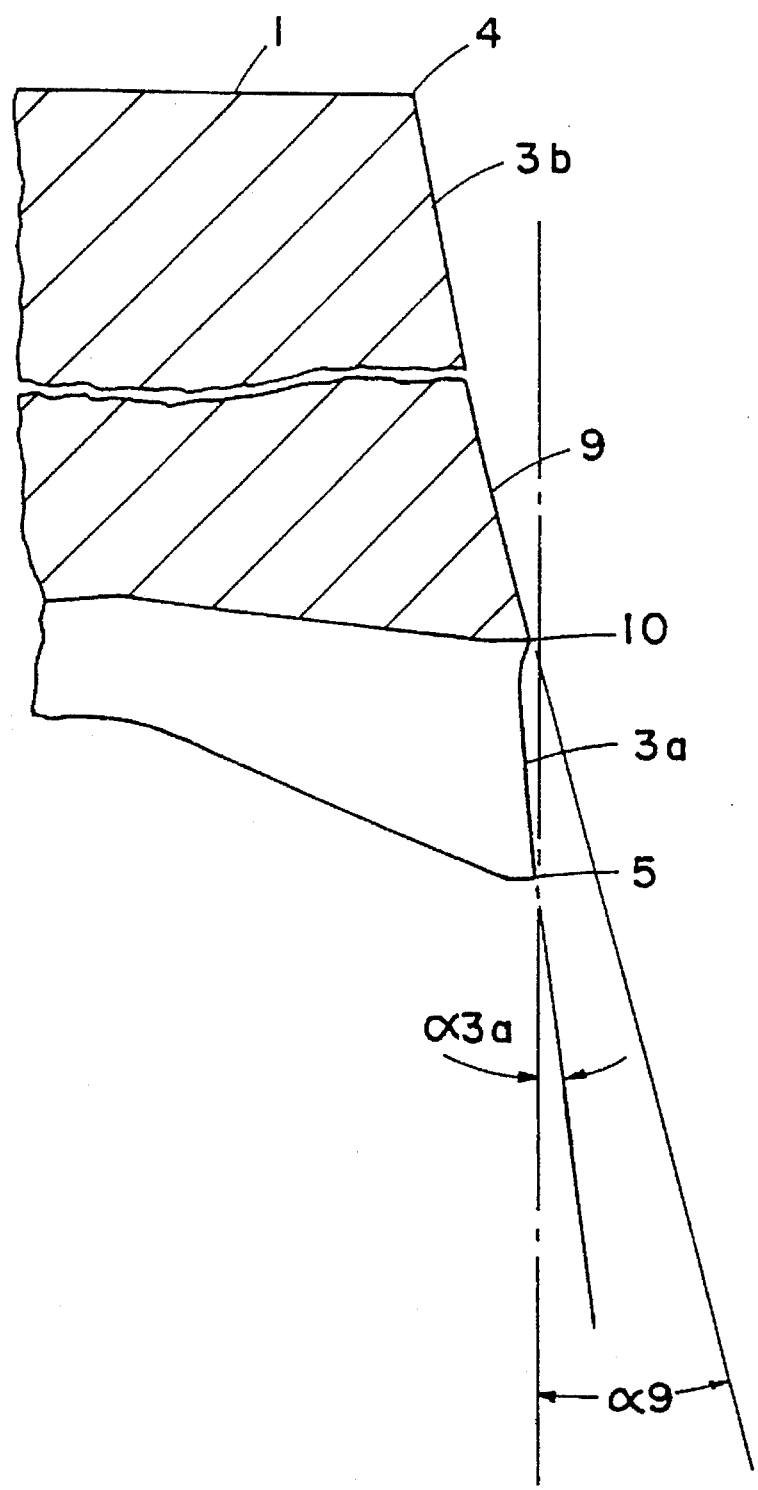
FIG. 6 is an enlarged cross-section of the insert shown in FIG. 1 along line VI—VI.

As can be clearly seen in the drawings, the secondary cutting edge 10 is displaced towards the base edge 4 with respect to its associated main cutting edge 5 whilst an imaginary extension thereof along the relief flank would be seen as being spaced from the surface of the adjacent relief flank 3 (see FIG. 2). The auxiliary relief flank 9 extends outwardly with respect to the base edge 4 at an angle $\alpha_9$, which is greater than $\alpha_{3a}$ at which the main relief flank extends with respect to the edge 4 (see FIG. 6).

The degree of displacement of the secondary cutting edge 10 towards the base edge 4 with respect to the main cutting edge 5, and the degree to which the secondary cutting edge 10 is displaced outwardly with respect to the adjacent main relief flank surface, is such that when the insert is viewed from above in the direction of the rake face 2, i.e., in a plan projection, each secondary cutting edge 10 does not project beyond its associated main cutting edge 5, i.e. is essentially and substantially collinear with the associated main cutting edges 5 or is even slightly inwardly disposed with respect to the main cutting edges 5.

Figure 3:
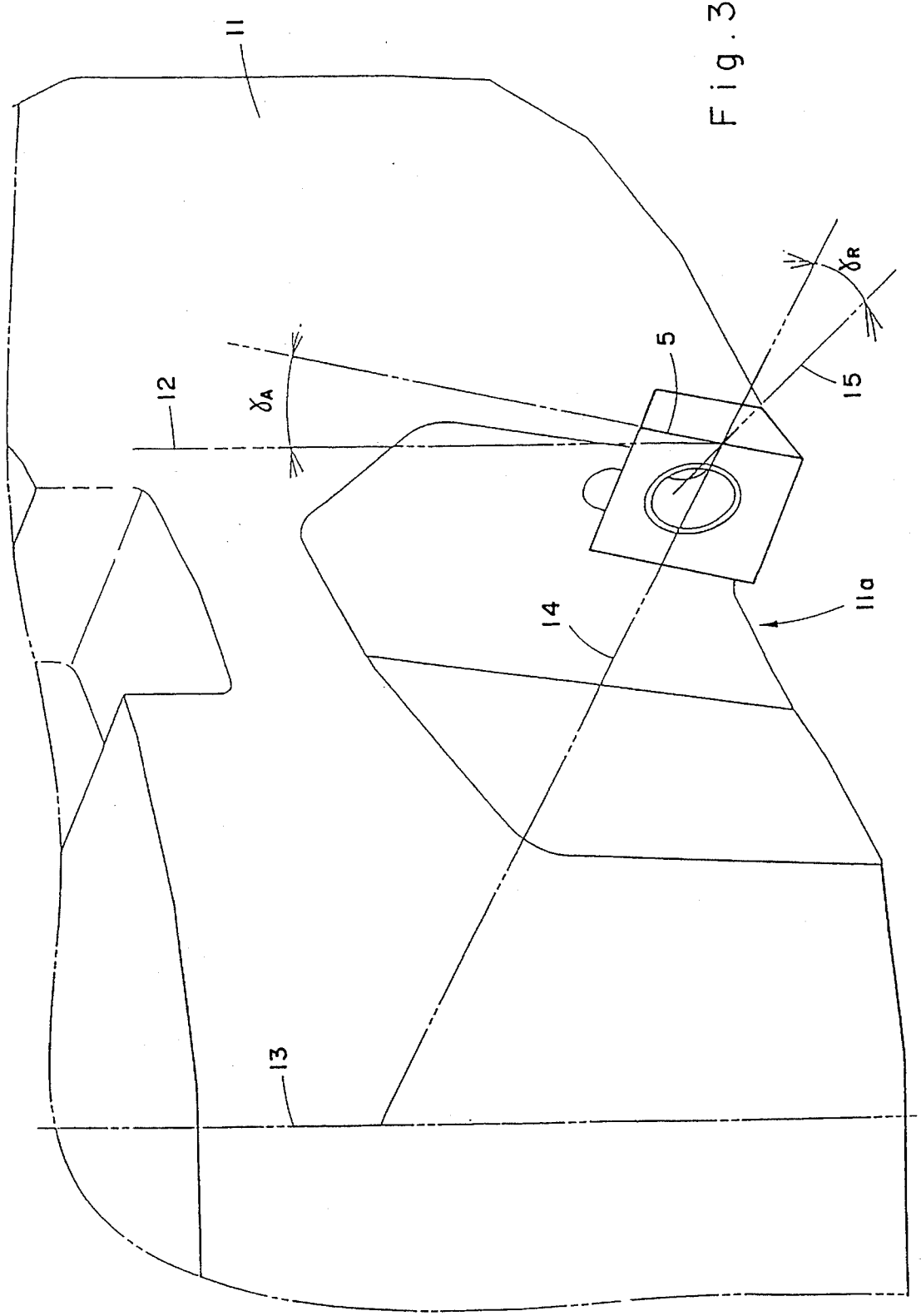
FIG. 3 is a schematic perspective view of a tool with the mounted insert, showing clearly the angular disposition of the insert on the tool.

Reference will now be made to FIG. 3 of the drawings for a description of the angular mounting of the insert in a peripheral pocket 30 of a cylindrical tool holder 11. It is to be noted that in both FIGS. 3 and 4, the insert and the holder are only shown schematically, without showing any of the particular constructional features of the insert in accordance with the invention. As can be seen, the insert is mounted so that its operative, main cutting edge 5 defines a positive, axial angle $\gamma_A$ with respect to a reference line 12 parallel to a rotary axis 13 of the tool. On the other hand, a negative, radial rake angle $\gamma_R$ is defined between a radius 14 extending from the rotary tool axis 13 and a projection line 15 of this radius on a plane defined by the main cutting edges 5 and intersecting the radius 14 at the point where the latter intersects the main cutting edge 5.

Figure 4:
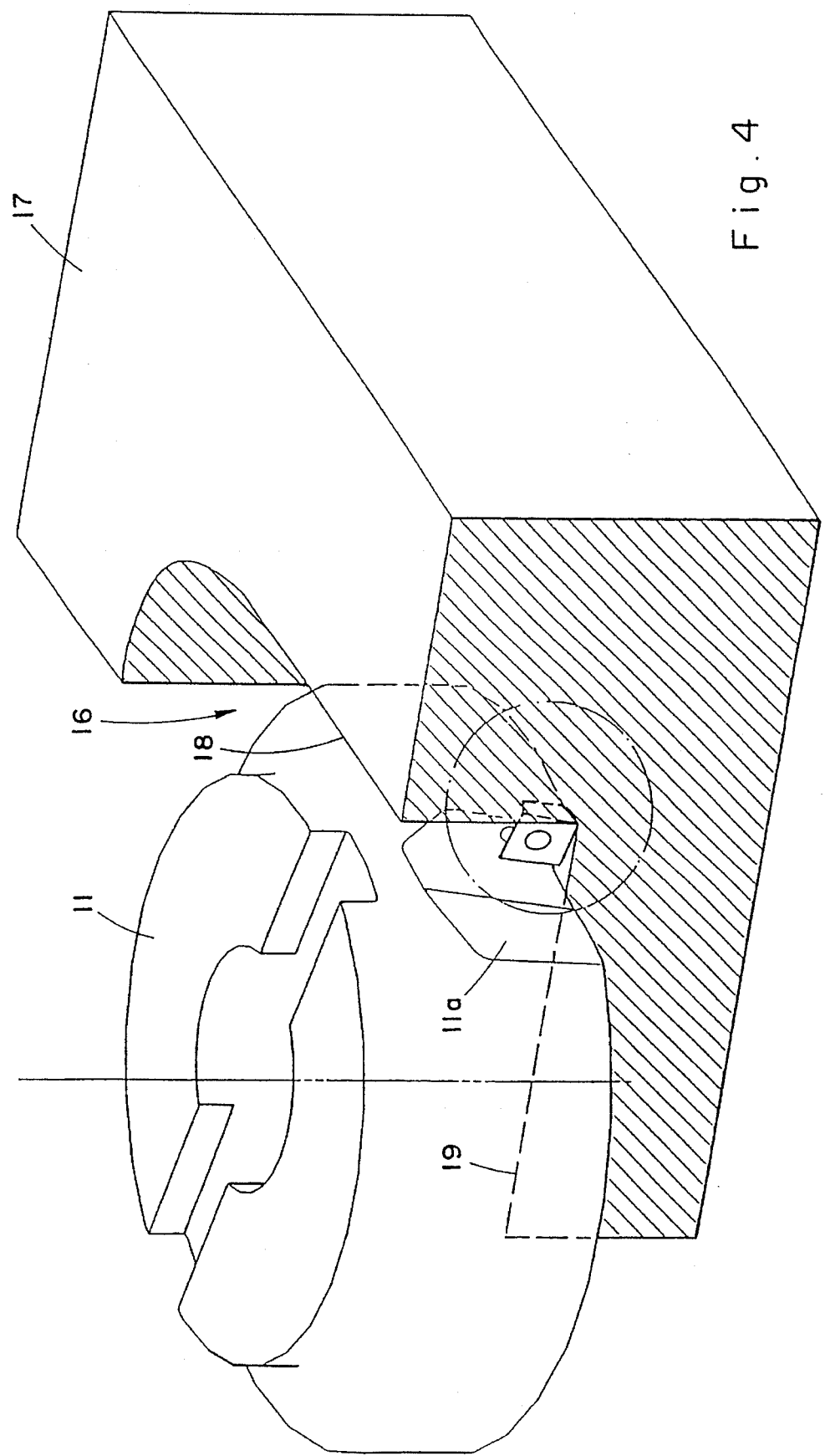
FIG. 4 is a schematic perspective view of a cutter and cutting insert shown in FIG. 3 during a milling operation with the cutting insert milling the lowermost portion of an upright wall.

As schematically shown in FIG. 4 of the drawings, the milling cutter tool is designed to mill a recess 16 in a workpiece 17 having an upright wall 18 and a base wall 19, which are disposed substantially at 90° with respect to each other.

Figure 5:
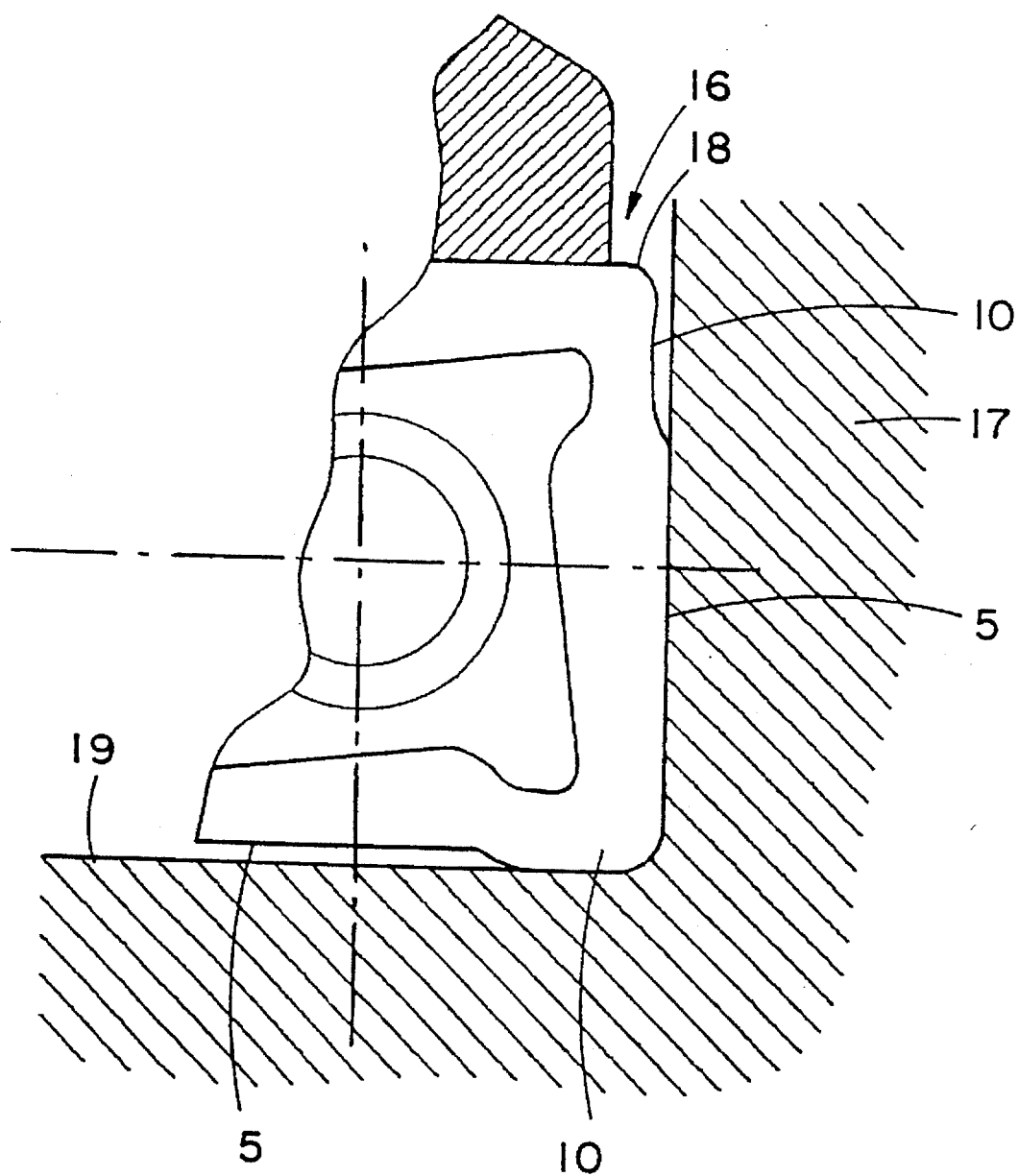
FIG. 5 is a view on an enlarged scale of a detail of the insert and machined workpiece shown in FIG. 4.

Reference will now be made to FIG. 5 of the drawings, which shows the operational disposition of the insert when mounted as shown in FIG. 3 in effecting milling.

As can be seen, and as a result of the previously described angular mounting of the insert, the upright wall 18 of the recess 16 is milled by the upright main cutting edge 5, whilst its associated secondary cutting edge 10 is spaced away from the upright wall 18. On the other hand, the immediately adjacent and transversely disposed secondary cutting edge 10 is in wiping contact with the base wall 19 of the recess 16 whilst its associated main cutting edge 5 is spaced therefrom.

In this way it is ensured that, whilst milling is effected by the main cutting edge 5, its associated secondary cutting edge 10 being spaced from the upright wall 18 and therefore is not subjected to wear. On the other hand, when the adjacent and transversely disposed secondary cutting edge 10 is used to "wipe" the base wall 19 of the recess 16, its associated main cutting edge 5 being spaced from the base wall 19 is also not exposed to wear.

It will be readily appreciated that this insert has the distinct advantage of being provided with secondary cutting edges used for "wiping", which do not project beyond the associated main cutting edges 5 and, in this way, no limitations are imposed on milling depth or the use of the insert for the various insert rows in the milling cutter.

Whilst the insert described above is provided with main cutting edges 5 substantially parallel to the base edges 4 of the insert, it will be appreciated that the main cutting edges can be arranged to slope towards the base edges, thereby providing the insert with an increased degree of axial positivity, without unduly increasing the angle of inclination of the insert seating.

Furthermore, and as shown in FIG. 1 of the drawings, each relief flank 3 of the insert is formed with upper and lower relief flank component portions 3a and 3b, separated by intersection region 3c. The upper relief flank component 3a and its associated cutting rake surface can be formed continuously curved, so as to ensure the maintenance of a substantially constant relief angle and radial rake angle along the length of the main cutting edge, when measured with respect to the tool. Alternatively, the upper relief flank component 3a can be made substantially planar, with the relief flank angle of the relief flank surface in the region of a leading end of the main cutting edge 5 substantially being equal to the relief angle in the region of the trailing end of the main cutting edge 5, all when measured with respect to the tool.

It will be understood that the relief flank component portion 3b is planar so as to ensure the effective seating of the insert in the tool. It will furthermore be understood that the invention is equally applicable to the situation where the relief flank 3 is formed as a single planar surface.

We claim:

1. An exchangeable cutting insert for mounting in a cutting tool and comprising:

a substantially square, planar base;

a substantially square upper rake surface and side flanks extending outwardly from respective edges of said base:

each side flank intersecting said rake surface at succesive main and secondary cutting edges, and forming an adjacent relief flank surface adjacent said main cutting edge and an auxiliary relief flank surface adjacent said secondary cutting edge, said secondary cutting edges adapted to be used as wipers;

an imaginary extension of an outermost portion of each secondary cutting edge along said adjacent relief flank surface of its associated main cutting edge and a portion of said auxiliary relief flank surface being outwardly spaced from said adjacent relief flank surface;

each secondary cutting edge being displaced towards said base with respect to its associated main cutting edge, wherein each secondary cutting edge does not project beyond a surface which is perpendicular to the base and passes through its associated main cutting edge.

2. A cutting insert according to claim 1, wherein each main cutting edge slopes towards said base.

3. A cutting insert according to claim 1 or 2, wherein each relief flank surface comprises a first portion adjacent said main cutting edge and a second planar portion adjacent said base and wherein said first relief flank portion and its adjacent rake surface are so curved that when the insert is mounted in the tool, a relief angle and a rake angle when measured with respect to the tool remain substantially invariant along the main cutting edge.

4. A cutting insert according to claim 1, wherein a relief angle adjacent to the main cutting edge is smaller than a relief angle adjacent to the secondary cutting edge.

* * * * *